United States Patent Office 3,222,356

Patented Dec. 7, 1965

3,222,356
4-(2-CYANO-2-PROPYLAZO)ANISOLE

Marion Burg, Metuchen, N.J., assignor to E. I. du Pont de Nemours and Company, Wilmington, Del., a corporation of Delaware No Drawing. Filed Dec. 1, 1961, Ser. No. 156,529
1 Claim. (Cl. 260—193)

This invention relates to certain novel azonitrile compounds and photopolymerizable compositions containing such compounds. This invention also relates to image-yielding photopolymerizable elements embodying photopolymerizable components.

Various photopolymerizable compositions are known to be useful in image-yielding elements. Some of these compositions and elements are useful in image transfer processes wherein the transfer is accomplished in a wet system or where water-yielding materials are present in addition to light-sensitive materials. Improved processes result in the formation of images without the need for a water or wet system. In assignee's Burg and Cohen application Serial No. 831,700, filed August 5, 1959, now U.S. Patent 3,060,023, for example, compositions and elements useful in a "dry" image transfer process are disclosed.

An object of this invention is to provide novel azonitrile compounds. Another object is to provide novel, improved photopolymerizable compositions. Still another object is to provide novel image-yielding photopolymerizable elements. Yet another object is to provide improved elements containing said azonitrile compounds. A further object is to provide such elements which can be polymerized by visible light sources. Still further objects will be apparent from the following description of the invention.

The novel azonitrile compounds of this invention are represented by the formula $$\mathrm{Y{-}N{=}N{-}\underset{\displaystyle R}{\overset{\displaystyle CN}{\underset{|}{\overset{|}{C}}}}{-}R'}$$

where R and R′, which may be alike or different, are alkyl radicals of 1 to 5 carbon atoms and R and R′ together form a cycloaliphatic ring member of 5 and 6 carbon atoms with their commonly adjoining carbon atom and Y is a member selected from the group consisting of unsubstituted and substituted benzene and naphthalene radicals, said substituents being selected from the group consisting of alkyl of 1 to 4 carbon atoms, alkoxy of 1 to 4 carbon atoms, $$-N\begin{matrix} R_1 \\ R_2 \end{matrix}$$

$R_1$ and $R_2$ being an alkyl of 1 to 4 carbon atoms and halogen; and a heterocyclic ring radical containing nitrogen selected from the group consisting of 3-pyridyl, thiazolyl, oxazolyl, selenazoyly an pyrryl, said heterocyclic ring radical being fused to the nucleus of an aryl compound selected from the group consisting of unsubstituted and substituted benzene and naphthalene, said substituents being selected from the group consisting of alkyl of 1 to 4 carbon atoms, alkoxy of 1 to 4 carbon atoms, carbalkoxy wherein the alkoxy group is of 1 to 4 carbon atoms, halogen and phenyl. The particularly preferred compounds are characterized by having an extinction coefficient ε above 10 in at least one region of the spectrum between 380 and 700 millimicrons. Specific compounds represented by the formula include:

4-(2-cyano-2-propylazo)anisole,

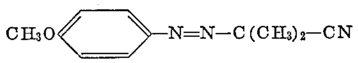

6-chloro-2-(2-cyano-2-propylazo)benothiazole,

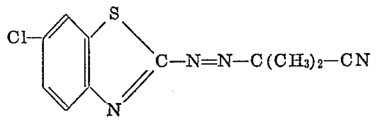

3-(1-cyanocyclohexylazo)quinoline,

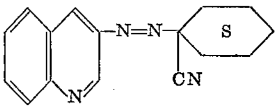

2-(1-cyanocyclohexylazo)-β-naphthiazole, and

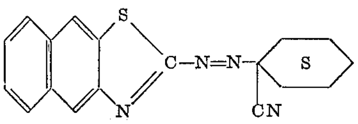

2-(2-cyano-2-hexylazo)benzothiazole.

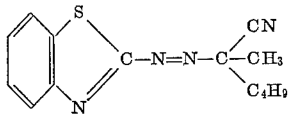

The novel azonitriles, as described above, are extremely useful in conjunction with monomeric compounds to make improved photopolymerizable compositions. The photopolymerizable compositions comprise a nongaseous ethylenically unsaturated compound containing at least one terminal ethylenic group, having a boiling point above 100° C. at normal atmospheric pressure, being capable of forming a high polymer by free-radical initiated, chain-propagating, addition polymerization and 0.001 to 10 parts by weight per 100 parts by weight of said ethylenically unsaturated compound of said azonitrile compound. The azonitrile compound, which functions as a photoinitiator, may be used as the sole photoinitiator or in combination with other photoinitiators such as polynuclear quinones, acyloin and acyloin ethers.

In a preferred element, 0.001 to 2 parts by weight per 100 parts by weight of the total weight of components of a thermal addition polymerization inhibitor is present in the photopolymerizable compositions.

The photopolymerizable compositions are utilized in image-yielding elements comprising a support bearing a photopolymerizable stratum, said stratum having a stick temperature greater than 18° C. and comprising at least one of the ethylenically unsaturated compounds of the type described above and an azo photoinitiator compound of the formula:

$$\mathrm{Y{-}N{=}N{-}Z}$$

wherein Y is as previously defined above and Z is a member selected from CN and $$\mathrm{-\underset{\displaystyle R}{\overset{\displaystyle CN}{\underset{|}{\overset{|}{C}}}}{-}R'}$$

wherein R and R′ are as defined above. The photoinitiator preferably has an extinction coefficient ε above 10 in at least one region of the spectrum between 380 and 700 millimicrons.

The photopolymerizable elements are particularly useful in image transfer processes conducted at room temperature or at elevated temperatures (thermal transfer) depending, of course, on the photopolymerizable composition utilized to form the stratum. Preferably the photopolymerizable composition contains a viscosity modifying agent which can increase or decrease the viscosity of the composition to make it easier to prepare coated polymerizable elements. Viscosity-modifying agents include fillers, both inorganic and polymeric; plasticizers and high-boiling solvents. A particularly preferred agent is a thermoplastic polymeric compound solid at 50° C. which serves as a binder for the monomeric compound and azo initiator. In order to utilize the element in room temperature transfer processes, the photopolymerizable stratum possesses a stick temperature greater than 18° C. but no greater than the temperature of the room. The photopolymerizable composition useful at room temperautre comprises an ethylenically unsaturated compound containing at least one terminal ethylenic group and the initiator as previously described. The thermoplastic compound solid at 50° C. can be present in combination with an amount of a viscosity modifier, e.g., 2 to 80%, geenrally 2 to 50% by weight, based on the weight of the ethylenically unsaturated compound.

In order to protect all embodiments of the elements from the effects of oxygen inhibition, they preferably have placed on their photopolymerizable stratum a cover sheet such as is described in assignee's Heiart applications Serial No. 81,377, filed January 9, 1961, now U.S. Patent 3,060,026, and Serial No. 123,651, filed July 13, 1961, and in assignee's Burg application entitled Elements and Processes, Serial No. 156,538, now abandoned, filed even date herewith and refiled October 30, 1962, Serial No. 234,214.

The photopolymerizable stratum of the above-described elements is exposed imagewise with visible and/or ultraviolet radiation, preferably visible, e.g., within the range of 380 to 700 millimicrons, so that the exposed image areas are polymerized with a subsequent increase in the stick temperature with substantially less polymerization and less increase in the stick temperature in the underexposed, complementary, adjoining coplanar image areas to provide a difference of at least 10° C. in the stick temperature between the exposed and underexposed areas. By bringing the exposed stratum into intimate contact, preferably under pressure, with an image-receptive support, e.g., paper, at the operating temperature, and separating the two surfaces, an image corresponding to the underexposed image areas is transferred to the surface of the image-receptive support. By such an exposure and transfer operation, at least one copy of the original image can be obtained. Multiple copies can be obtained by repeating the transfer procedure using appropriate coating thicknesses of the stratum, pressures and temperatures to give the desired number of copies. Pressure can be applied by means well known to the art, e.g., rollers, flat or curved surfaces of platens, etc. The contact time ranges from 0.01 to 10 seconds, about 0.1 second, in general, being preferred. Shorter periods of contact are possible, however, since time is not critical.

The term "underexposed" as used herein is intended to cover the image areas which are completely unexposed or those exposed only to the extent that there is addition polymerizable compound still present in sufficient quantity that the softening temperature remains substantially lower than that of the complementary exposed image areas. The term "stick temperature," as applied to either an underexposed or exposed areas of a photopolymerizable stratum, means the temperature at which the image area in question sticks or adheres (transfers), within 5 seconds, under slight pressure, e.g., thumb pressure, to analytical paper (Schleicher & Schull analytical filter paper No. 595) and remains adhered in a layer of at least detectable thickness after separation on the analytical paper from the stratum. The term "operating temperature" means the temperature at which the operation of transferring the image from the photopolymerizable stratum to the image-receptive surface is actually carried out. The operating temperature is intermediate between the "stick" temperatures of the underexposed and exposed areas of a photopolymerizable stratum. The operating temperature may be at room temperature in the case of elements having a composition which is liquid or tacky at room temperature. The operating temperature may be as high as 220° C. for the thermal transfer operation.

Imagewise exposure of the photopolymerizable element requires the use of a light source rich in radiation in the visible and/or ultraviolet region of the spectrum. For the azo initiators of this invention, the exposure is preferably in the visible, e.g., between 380 and 700 millimicrons. Such light sources include ordinary tungsten lamps, fluorescent lamps, mercury arcs, carbon arcs, photoflood lamps, sunlamps, photoflash, etc. The surfaces of the exposing sources are customarily maintained at a distance of up to about 20 inches or more from the photopolymerizable layer.

Imagewise exposure in the above-described invention can be made through a stencil, line or halftone or continuous tone negative or positive or other suitable transparency and can be either by contact or projection exposure. Alternatively, reflectographic exposure techniques may also be employed. Sufficient imagewise exposure to actinic radiation is given until substantial addition polymerization takes place in the exposed areas to form an addition polymer and significantly less polymerization takes place in the underexposed areas.

The photopolymerizable compositions of the elements useful in either the room temperature or thermal transfer processes contain free-radical initiated, chain-propagating addition polymerizable ethylenically unsaturated monomeric compounds such as an alkylene or a polyalkylene glycol diacrylate prepared from an alkylene glycol of 2 to 15 carbons or a polyalkylene ether glycol of 1 to 10 ether linkages, and those disclosed in Martin and Barney U.S. Patent 2,927,022, issued March 1, 1960, e.g., those having a plurality of addition polymerizable ethylenic linkages, particularly when present as terminal linkages, and especially those wherein at least one and preferably most of such linkages are conjugated with a doubly bonded carbon, including carbon doubly bonded to carbon and to such heteroatoms as nitrogen, oxygen and sulfur. Outstanding are such materials wherein the ethylenically unsaturated groups, especially the vinylidene groups, are conjugated with ester or amide structures. The following specific compounds are further illustrative of this class: unsaturated esters of alcohols, preferably polyols and particularly such esters of the alphamethylene carboxylic acids, e.g., ethylene diacrylate, diethylene glycol diacrylate, glycerol diacrylate, glycerol triacrylate, ethylene dimethylacrylate, 1,3-propanediol dimethacrylate, 1,2,4-butanetriol trimethacrylate, 1,4-cyclohexanediol diacrylate, 1,4-benzenediol dimethacrylate, pentaerythritol triacrylate and trimethacrylate, pentaerythritol tetraacrylate and tetramethyacrylate, dipentaerythritol hexaacrylate, 1,3-propanediol diacrylate, 1,5-pentanediol dimethacrylate, the bis-acrylates and methacrylates of polyethylene glycols of molecular weight 200–1500, and the like; unsaturated amides, particularly those of the alphamethylene carboxylic acids, and especially those of alpha, omega-diamines and oxygen-interrupted omega-diamines, such as methylene bis-acrylamide, methylene bis-methacrylamide, ethylene bis-methacrylamide, 1,6-hexamethylene bisacrylamide, diethylene triamine trismethacrylamide, bis(gamma - methacrylamidopropoxy)ethane betamethacrylamidoethyl methacrylate, N-(beta-hydroxyethyl)-beta-(methacrylamido)ethyl acrylate and N,N-bis-(beta-methacrylyloxyethyl)acrylamide; vinyl esters such as divinyl succinate, divinyl adipate, divinyl phthalate, divinyl terephthalate, divinyl benzene-1,3-disulfonate, and divinyl butane-1,4-disulfonate; styrene and derivatives thereof and unsaturated aldehydes, such as sorbaldehyde (hexadienal). An outstanding class of these preferred addition polymerizable components are the esters and amides of alpha-methylene carboxylic acids and substituted carboxylic acids with polyols and polyamides wherein the molecular chain between the hydroxyls and amino groups is solely carbon or oxygen-interrupted carbon. The preferred monomeric compounds are polyfunctional, but monofunctional or difunctional monomers can also be used. The amount of monomer added varies with the particular polymers used.

The ethylenic unsaturation can be present as an extralinear substituent attached to a thermoplastic linear polymer, such as polyvinylacetate/acrylate, cellulose acetate/acrylate, cellulose acetate/methacrylate, N-acrylyloxymethylpolyamide, N-methacrylyloxymethylpolyamide, allyloxymethylpolyamide, etc., in which case the monomer and polymer function are combined in a single material.

The photopolymerizable monomers listed above which are normally solid and non-tacky at room temperature can be used when they are present in combination with viscosity modifiers which lower viscosity, e.g., plasticizers or high-boiling solvents, so that they become pressure-transferable at room temperature like the less viscous or tacky monomeric compounds. Suitable plasticizers include low molecular weight polyalkylene oxides, ethers and esters, e.g., triethylene glycol dicaprylate, polypropylene glycol mono-n-butyl ether; and other esters such as phthalates, e.g., dibutyl phthalate; adipates, e.g., diisobutyl adipate; sebacates, e.g., dimethyl sebacate. In addition, phosphates, e.g., tricresyl phosphate; amides and sulfonamides, e.g., n-ethyl-p-toluenesulfonamide; carbonates, e.g., bis(dimethylbenzyl) carbonate; citrates, e.g., triethyl citrate; glycerol esters, e.g., glycerol triacetate; laurates, e.g., n-butyl laurate; oleates, stearates, etc., are also useful.

The azo initiator compounds within the scope of this invention are generally synthesized by converting a Y-containing amine to its diazonium salt and then coupling it with an aliphatic nitrile compound. The diazonium salt is prepared according to the following reaction:

$$Y—NH_2+2HX+NaNO_2 \rightarrow YN_2X+2H_2O$$

This reaction is discussed in detail in K. H. Saunders, The Aromatic Diazo-Compounds and Their Technical Applications, Edward Arnold & Co., London, England, 1949, pages 2 to 20. The coupling of the diazonium salt with an aliphatic nitrile is discussed by S. M. Parmerter, Organic Reactions, volume 10, edited by Roger Adams et al., John Wiley and Sons, Inc., New York, 1959, particularly pages 17 and 72. The reaction is also discussed by Borsche and Manteuffel, Ann. 534, 56 (1938). Examples of preferred amines containing the Y radical include: 2 - aminobenzothiazole, 2-amino-6-methylbenzothiazole, 2-amino-6-ethylbenzothiazole, 2-amino-6-methoxybenzothiazole, 2-amino-6-ethoxybenzothiazole, 2-amino - 6-phenylbenzothiazole, 2-amino-6-chlorobenzothiazole, 2-amino-6-bromobenzothiazole, 2-amino-6-carbethoxybenzothiazole, 2-aminobenzselenazole and other benzselenazoles corresponding to the above benzothiazoles, 3-aminoquinoline, 3-amino-2-methylquinoline, 3-amino-2-phenylquinoline, 2-amino-benzoxazole, 2-amino-5-chlorobenzoxazole, 3-amino-indole, 3-amino-2-phenylindole, etc. Specific aryl amines containing the Y radical include p-methoxyaniline, 2-amino-naphthalene, p-amino diethylaniline, 1-amino-4-propylnaphthalene, etc. Examples of useful nitriles are isobutyronitrile, 1-methylvaleronitrile, di-n-propyl-acetonitrile and cyclohexanecarbonitrile.

Suitable polymerization inhibitors that can be used in photopolymerizable compositions include p-methoxyphenol, hydroquinone, and alkyl and aryl-substituted hydroquinones and quinones, tert-butyl catechol, pyrogallol, copper resinate, naphthylamines, beta-naphthol, cuprous chloride, 2,6-di-tert-butyl p-cresol, phenothiazine, pyridine, nitrobenzene, dinitrobenzene, iodine, sulfur, p-toluquinone and chloranil.

The image-yielding photopolymerizable elements are preferably made by coating or extruding a photopolymerizable composition as described above and a volatile solvent in the form of a thin film onto the surface of a suitable support to form a layer which, when dry, is from 0.00005 inch to 0.005 inch in thickness, preferably 0.0001 to 0.001 inch. Suitable support materials are stable at the operating temperatures used in the instant invention. Suitable supports include those disclosed in U.S. Patent 2,760,863, glass, wood, paper (including waxed or transparentized paper), cloth, cellulose esters, e.g., cellulose acetate, cellulose propionate, cellulose butyrate, etc., and other plastic compositions such as polyamides, polyesters, etc. The support may have in or on its surface and beneath the photopolymerizable stratum an antihalation layer as disclosed in said patent or other substrata needed to facilitate anchorage to the base. The elements can be made by procedures described in the aforesaid patent. Melt extrusion, solvent extrusion, reverse roll coating and skim coating techniques can be used. Doctor knives and air doctor knives can be used to form the coatings.

The image receptive support to which the image is transferred must also be stable at the operating temperatives. The particular support used is dependent on the desired use for the transferred image and on the adhesion of the image to the base. Suitable supports include paper including bond paper, resin and clay sized paper, resin coated or impregnated paper, cardboard, metal sheets, foils and meshes, e.g., aluminum, copper, steel, bronze, etc.; wood, glass, nylon, rubber, polyethylene terephthalate; regenerated cellulose, cellulose esters, e.g., cellulose acetate; silk cotton, viscose rayon and metal fabrics or screens.

The receptive support may have a hydrophilic surface or may contain on its surface chemical compounds which react with compounds being transferred so as to produce differences in color, hydrophilicity or conductivity between the exposed and underexposed areas or for improved adhesion or brightening of the receptive support. The image-receptive surface may be smooth, contain roughening agents such as silica, be perforated or be in the form of a mesh or screen.

In a preferred embodiment of the photopolymerizable element, a thermoplastic compound solid at 50° C. is present in the photopolymerizable composition. The thermoplastic compound is present with the monomer in amounts ranging from 3 to 97 and 97 to 3 parts by weight, respectively. Suitable viscosity-modifying agents include, e.g., (A) Copolyesters, e.g., those prepared from the reaction product of a polymethylene glycol of the formula $HO(CH_2)_nOH$, wherein $n$ is a whole number 2 to 10, inclusive, and (1) hexahydroterephthalic, sebacic and terephthalic acids, (2) terephthalic, isophthalic and sebacic acids, (3) terephthalic and sebacic acids, (4) terephthalic and isophthalic acids, and (5) mixtures of copolyesters prepared from said glycols and (i) terephthalic, isophthalic and sebacic acids and (ii) terephthalic, isophthalic, sebacic and adipic acids.

(B) Nylons or polyamides, e.g., N-methoxymethyl polyhexamethylene adipamide;

(C) Vinylidene chloride copolymers, e.g., vinylidene chloride/acrylonitrile; vinylidene chloride/methylacrylate and vinylidene chloride/vinylacetate copolymers;

(D) Ethylene/vinyl acetate copolymers;

(E) Cellulose ethers, e.g., methyl cellulose, ethyl cellulose and benzyl cellulose;

(F) Polyethylene;

G) Synthetic rubbers, e.g., butadiene/acrylonitrile copolymers, and chloro-2-butadiene-1,3 polymers;

(H) Cellulose esters, e.g., cellulose acetate, cellulose acetate succinate and cellulose acetate butyrate;

(I) Polyvinyl esters, e.g., polyvinyl acetate/acrylate, polyvinyl acetate/methacrylate and polyvinyl acetate;

(J) Polyacrylate and alpha-alkyl polyacrylate esters, e.g., polymethyl methacrylate and polyethyl methacrylate;

(K) High molecular weight polyethylene oxides of polyglycols having average molecular weights from about 4,000 to 1,000,000;

(L) Polyvinyl chloride and copolymers, e.g., polyvinyl chloride/acetate;

(M) Polyvinyl acetal, e.g., polyvinyl butyral, polyvinyl formal;

(N) Polyformaldehydes;

(O) Polyurethanes;

(P) Polycarbonates;

(Q) Polystyrenes;

(R) Extralinear unsaturated polyamides, e.g., N-acryloxymethyl and N-methacrylyloxymethyl polyamides.

To the thermoplastic polymer constituent of the photopolymerizable composition there can be added non-thermoplastic polymeric compounds to improve certain desirable characteristics, e.g., adhesion to the base support, adhesion to the image-receptive support on transfer, wear properties, chemical inertness, etc. Suitable non-thermoplastic polymeric compounds include polyvinyl alcohol, cellulose, anhydrous gelatin, phenolic resins and melamine-formaldehyde resins, etc. If desired, the photopolymerizable layers can also contain immiscible polymeric or non-polymeric organic or inorganic fillers or reinforcing agents which are essentially transparent at the wave lengths used for the exposure of the photopolymeric material, e.g., the organophilic silicas, bentonites, silica, powdered glass, colloidal carbon, as well as various types of dyes and pigments. Such materials are used in amounts varying with the desired properties of the photopolymerizable layer. The fillers are useful in improving the strength of the composition, reducing tack and, in addition, as coloring agents.

Various dyes, pigments, thermographic compounds and color-forming components can be added to the photopolymerizable compositions to give varied results after the transfer step. These added materials, preferably, should not absorb excessive amounts of radiation at the exposure wave length or inhibit the polymerization reaction.

Among the dyes useful in the invention are Acid Violet RRL (CI 42425), Red Violet 5RS (CI 4269), Night Green B (CI 42115), CI Direct Yellow 9 (CI 19540), CI Acid Yellow 17 (CI 18965), CI Acid Yellow 29 (CI 18900), Tartrazine (CI 19140), Supramine Yellow G (CI 19300), Buffalo Black 10B (CI 27790), Naphthalene Black 12R (CI 20350), Safranine Bluish (CI Basic Violet 5), Auramine (CI Basic Yellow 2), Rhodamine 6GDN (CI Basic Red 1), Azosol Fast Black MA (CI Solvent Black 19), and Methylene Violet (CI Basic Violet 5).

Suitable pigments include, e.g., $TiO_2$, colloidal carbon, graphite, phosphor particles, ceramics, clays, metal powders such as aluminum, copper, magnetic iron and bronze, etc. The pigments are useful when placed in the photosensitive layer or in an adjacent nonphotosensitive layer.

Useful-thermographic additives, e.g., 3-cyano-4,5-dimethyl-5-hydroxy-3-pyrrolin-2-one, are disclosed in Howard, U.S. Patent 2,950,987. Such compounds, in the presence of activators, e.g., copper acetate, are disclosed in assignee's Belgian Patent 588,328. Other useful thermographic additives are disclosed in the following U.S. Patents: 2,625,494; 2,637,657; 2,663,654; 2,663,655; 2,663,-656; and 2,663,657.

Suitable color-forming components which form colored compounds on the application of heat or when brought in contact with other color-forming components on a separate support include:

(1) Organic and inorganic components: dimethyl glyoxime and nickel salts; phenolphthalein and sodium hydroxide; starch/potassium iodide and oxidizing agent, i.e., peroxides; phenols and iron salts; thioacetamide and lead acetate; silver salt and reducing agent, e.g., hydroquinone.

(2) Inorganic components: ferric salts and potassium thiocyanate; ferrous salts and potassium ferricyanide; copper, mercury or silver salts and sulfide ions; lead acetate and sodium sulfide.

(3) Organic components: 2,4-dinitrophenylhydrazine and aldehydes or ketones; diazonium salt and phenol or naphthol, e.g., benzenediazonium chloride and β-naphthol; substituted aromatic aldehydes or amines and a color photographic developer compound, e.g., p-diethylaminobenzaldehyde and p-diethylaminoaniline; color photographic developer compound/active methylene compound and an oxidizing agent, e.g., p-diethylaminotoluidine/α-cyanoacetophenone and potassium persulfate.

The invention will be further illustrated by but is not intended to be limited to the following detailed procedure and examples. Example II is not intended to represent a complete embodiment of this invention but is merely intended to illustrate that the azo initiators described herein are subject to decomposition by visible light.

PROCEDURE A

*4-(2-cyano-2-propylazo)anisole* p-Anisidine, 6.2 g. (0.05 mole), in 10.5 ml. concentrated hydrochloric acid and 140 ml. water was diazotized at 0–5° C. with a solution of 3.45 g. (0.05 mole) sodium nitrite in 10 ml. water. After stirring at this temperature for 10 min., the diazonium solution was added to a cold mixture of 3.5 g. (0.05 mole) of isobutyronitrile and 300 ml. water containing 18 g. (0.13 mole) hydrated sodium acetate. The resulting turbid solution was allowed to remain at room temperature for twelve hours during which time a brownish solid separated. The solid was removed by filtration and air dried. By extracting with several portions of low boiling petroleum ether, a dark brown insoluble impurity was removed. Concentration at room temperature of the combined extracts afforded a red brown solid, M.P. 98° C. The solid was dissolved in a minimum amount of benzene. By adding low boiling petroleum ether yellow crystals separated. By repeating this step a pale yellow solid was isolated, M.P. 97–98° C. (with decomposition), $\lambda$ max.=365 m$\mu$, $\epsilon=2.2\times10^4$ (cyclohexane).

*Example 1*

A solution of "Pontacyl" Wool Blue (CI Acid Blue 59) dye was prepared by adding 0.8 of the dye to 80 ml. ethanol, bringing to a boil, filtering and bringing up to 64 g. with ethanol. Three grams of this dye solution were added to a solution containing 0.01 g. of the azo initiator, p-diethylaminobenzenediazocyanide, prepared as described by Freeman et al., J. Chem. Soc., 3388 (1952), and 13.3 g. of a cellulose acetate butyrate-polyethylene glycol diacrylate solution prepared by mixing at room temperature in a Waring food and beverage blender 90 g. of polyethylene glycol diacrylate, 60 g. of cellulose acetate butyrate and 350 g. of acetone. The cellulose acetate butyrate contained ca. 20.5% acetyl groups, ca. 26% butyryl and ca. 2.5% hydroxyl groups and had a viscosity of 9 to 13.5 poises as determined by ASTM method D-1343 in solution described as Formula A, ASTM method D-871-54T. The polyethylene glycol diacrylate was derived from polyethylene glycol with an average molecular weight of 300. The solution was brought up to 20 g. with acetone and coated under subdued lighting on 0.001-inch thick polyethylene terephthalate film base and, after drying to a thickness of 0.0003 inch, a similar sheet of polyethylene terephthalate film base was laminated over the coating by pressing, at room temperature, with a rubber squeegee. A sample of this coating was exposed through a transparency bearing a line image to a Macbeth 140 ampere high carbon arc light source at a distance of 15 inches for one minute, the radiation from the arc being required to pass through a Wratten 2A filter which has an optical density greater than 3.0 at wavelengths below 400 millimicrons. After exposure, the element was delaminated, hot pressed on paper and the film base bearing the adhering polymerized material, was separated (stripped off by hand) while still hot to leave a clear blue positive copy on the paper support.

The above coating was essentially duplicated except for the omission of the azo initiator from the coating composition. Under identical testing conditions, except that the filter was not used, there occurred a uniform transfer of the coating composition to the receptor paper so that the latter had a uniform blue coloring. Thus, in the absence of an initiator, it was apparent that no polymerization had occurred. From these two tests, it was evident that the azo initiator was active in the visible region of the spectrum, i.e., above 380 millimicrons.

*Example II*

The azo initiator used in the element described in Example I, p-diethylaminobenzenediazocyanide, has an absorption maximum at 500 millimicrons. To establish that a photochemical reaction results from absorption of visible light at this wavelength, λ max., a solution of the initiator was irradiated with light of wavelengths equal to, greater than, and less than λ max. and the changes in optical density at λ max. were compared. Prior to irradiation, the initiator solution (0.0025 g. of initiator dissolved in 1000 ml. of dimethylformamide) had an optical density of 0.65 at 500 millimicrons as measured on the Cary Recording Spectrophotometer Model 14MS, Serial 14, Applied Physics Corp., Pasadena, California. The relative exposure (product of intensity and time of exposure) with light of a wavelength of 500 millimicrons (λ max.) required to reduce the optical density to 0.1 at λ max. was determined. Twenty times as much exposure was required at a wavelength of 580 millimicrons as was required at λ max. to reduce the optical density to 0.1. Twenty-six times as much irradiation was required at a wavelength of 420 millimicrons as was required at λ max. to effect the same degree of photoreaction. No new absorption bands between 380 and 700 millimicrons were formed as a result of the irradiation. The polymerization initiator compound acts by forming free radicals which in turn initiate the polymerization reaction. A requisite of such a photoinitiator therefore is that it form free radicals at the wavelength of exposing radiation.

*Example III*

Eight-tenths of a gram of "Pontacyl" Wool Blue GL (CI Acid Blue 102) was added to 80 ml. of ethanol. The mixture was brought to a boil, filtered, and the filtrate brought up to a weight of 64 g. with ethanol. Three grams of the dye solution thus prepared was added to a solution containing 13.3 g. of a polyethylene glycol diacrylate/cellulose acetate butyrate solution prepared as in Example I and 0.05 g. of the azo initiator prepared as described in procedure A. The solution was brought up to a weight of 20 g. with acetone, coated and laminated as in Example I. Exposure was made for two seconds through a transparency bearing a line image to a Macbeth 140 ampere high carbon arc light source at a distance of 15 inches. On transferring by hot pressing as described in Example I, a clear blue positive copy of the image was obtained on the bond paper support.

*Example IV*

A test solution consisting of 1.5 ml. of polyethylene glycol diacrylate as described in Example I to which was added 0.05 or 0.01% by weight of an azo photoinitiator set forth below was placed in a 1.5 cm. x 8 cm. Pyrex test tube and flushed with nitrogen for five minutes. Exposure was made to an air-cooled 400-watt high pressure mercury arc lamp, G.E. H400–R1, at a distance of eight inches with the test tube being contained in a blacklined box having a window with a Wratten 2C filter placed over it. Polymerization time was recorded as that time required for formation of a gel or polymer skin on the test tube wall. The sharp cutting Wratten 2C filter, with an optical density greater than 3.0 at wavelengths below 380 millimicrons, was effective in removing essentially all the ultraviolet radiation while passing most of the visible light. The Wratten 2C filter transmits 38% of the radiation at 400 millimicrons, 0.1% at 380 millimicrons.

| Azo initiator: | Polymerization time (min.) |
|---|---|
| 1. p-diethylaminobenzenediazocyanide (0.01% by weight) | 1, gel. |
| 2. 4-(2-cyano-2-propylazo)anisole (0.05% by weight) | 6, soft. |
| 3. Control (no initiator present) | 180, no polymerization. |

In the above examples, the abbreviation CI refers to the Colour Index, 2nd edition, The Society of Dyers and Colourists, Dean House, Picadilly, Bradford, Yorkshire, England, 1956, and The American Association of Textile Chemists and Colorists, Lowell Technological Institute, Lowell, Massachusetts, U.S.A.

As indicated above the photopolymerizable elements are useful in image transfer processes conducted at room temperature or at elevated temperatures. Such processes are useful for a variety of copying, printing, decorative and manufacturing applications. Multicopies of the process images can be obtained from the transferred image. The number of copies prepared is dependent on the photopolymerizable composition thickness as well as the process conditions. The process is also useful for preparing multicolor reproductions.

Lithographic surfaces can be produced by transferring a hydrophobic layer to a hydrophilic receptor surface or a hydrophilic layer to a hydrophobic receptor surface. The images on the lithographic surface can be made impervious to chemical or solvent attack by post-exposing the lithographic surface. Alternatively, the exposed areas of the photopolymerizable composition, after the underexposed areas are transferred, can be used as a lithographic-offset printing plate if they are hydrophobic and the original sheet supported is hydrophilic or vice versa.

The transferred images are not only useful for making copies of the original image transparency by dry methods as indicated above but after transfer of the underexposed areas to a receptor support, the exposed surface can be treated with, e.g., aqueous solutions, dyes, inks, etc., to form colored images. Colored copies of the original image can be obtained when the wet surface is brought into intimate contact with a receptor support and the surfaces separated. Solvents which are used for the spirit copying, e.g., ethanol, water, should meter out the dye used and be a non-solvent for the polymer, i.e., the solubility of the dye and binder are important factors in selecting the solvent.

The exposed photopolymerized stratum can be brought into intimate contact at room temperature with a separate support, e.g., a roll of carbon or graphite; a roll coated with pigment dispersions; a roll which has a continuously replenished pigment or inked surface; a separate support coated with pigments with or without dyes, color-forming compounds, hydrophilic and hydrophobic surfaces or a metallized film. Upon removing the surfaces, the areas corresponding to the underexposed areas of the photopolymerized composition are transferred. A duplicate copy and a reverse copy are formed simultaneously.

The exposed photopolymerized surfaces are also useful with various dusting techniques, e.g., with finely divided dyes and pigments, the materials adhering in the underexposed areas. Multiple copies can be prepared. The dusted films are useful as filters, in the preparation of lithographic printing plates by using hydrophilic or hydrophobic materials, in the manufacture of printed circuits and electrically conducting or photoconductive matrices, in the preparation of two and multicolor reproductions and phosphor and ceramic patterns.

In addition to the above uses, the novel azo initiators are useful in other processes involving development of an image, e.g., in preparing relief printing plates or offset plates wherein solvent removal of unpolymerized material might be used. Thus these elements would be useful in processes such as described in Plambeck U.S. Patent 2,760,863 and in Martin et al., U.S. Patent 2,927,022. The azo initiators, of course, are useful in bulk, emulsion, etc., type polymerizations of the disclosed monomers.

An advantage of the azo initiators herein employed is their relatively great solubility. Another advantage of the invention is that the compositions and elements containing the azo initiators can in many cases be exposed by visible light. Thus, the exposing light source may be simple and inexpensive, such as tungsten or fluorescent lamps. Still another advantage is that the ability to work with reasonably concentrated solutions of the initiators is desirable. In this respect, the azo iniators containing water-solubilizing groups are particularly advantageous because they can be used in aqueous systems. A further advantage of this invention is that many different types of image-receptive surfaces, as described previously above, can be used, i.e., any readily available uncoated paper will serve satisfactorily. Yet a further advantage is the ease of making multiple copies. Many other advantages will be apparent from the above specification.

What is claimed is:

4-(2-cyano-2-propylazo)anisole.

References Cited by the Examiner

UNITED STATES PATENTS

| | | | |
|---|---|---|---|
| 2,515,691 | 7/1950 | Beersmans | 260—193 XR |
| 2,525,611 | 10/1950 | Long | 260—193 |
| 2,658,889 | 11/1953 | Goldberg et al. | 260—193 |
| 2,893,868 | 7/1959 | Barney | 96—115 |
| 2,972,540 | 2/1961 | Saner et al. | 96—115 |

OTHER REFERENCES

Ford et al.: "Journal Chemical Society" (London), 1958, pages 1297–8, 260–192 Lit.

References Cited by the Applicant

UNITED STATES PATENTS

| | | |
|---|---|---|
| 2,471,959 | 5/1949 | Hunt. |

CHARLES B. PARKER, *Primary Examiner.*

PHILIP E. MANGAN, *Examiner.*